(12) United States Patent
Fourrey

(10) Patent No.: US 6,291,803 B1
(45) Date of Patent: Sep. 18, 2001

(54) METHOD AND SYSTEM OF REGULATING HEAT IN A VEHICLE SEAT

(75) Inventor: François Fourrey, Corquilleroy (FR)

(73) Assignee: Bertrand Faure Equipments SA, Boulogne (FR)

( * ) Notice: Subject to any disclaimer, the term of this patent is extended or adjusted under 35 U.S.C. 154(b) by 0 days.

(21) Appl. No.: 09/512,552

(22) Filed: Feb. 24, 2000

(30) Foreign Application Priority Data

Mar. 1, 1999 (FR) ................................................ 99 02499

(51) Int. Cl.$^7$ ...................................................... H05B 1/02
(52) U.S. Cl. ........................... 219/497; 219/202; 219/518; 219/501; 297/180.12
(58) Field of Search ..................................... 219/202, 203, 219/481, 497, 499, 501, 505, 508; 297/180.12, 180.1

(56) References Cited

U.S. PATENT DOCUMENTS

| | | | |
|---|---|---|---|
| 5,948,297 | * 9/1999 | Haubner et al. | 219/202 |
| 5,981,918 | * 11/1999 | Topp et al. | 219/499 |
| 6,093,910 | * 7/2000 | McClintock et al. | 219/217 |

FOREIGN PATENT DOCUMENTS

| | | |
|---|---|---|
| 41 41 062 | 6/1993 | (DE) . |
| 41 41 224 | 6/1993 | (DE) . |
| 0 863 450 | 9/1998 | (EP) . |
| 08205964 | 8/1996 | (JP) . |
| 10086650 | 4/1998 | (JP) . |
| WO 98/01059 | 1/1998 | (WO) . |

OTHER PUBLICATIONS

French Preliminary Search Report, Nov. 17, 1999, Appl. No. FR 9902499.

Pang, "Thermal Foam Keeps Seats and Headliners Warm in Winter, Cool in Summer," *Automotive & Transportation Interiors*, Oct. 1998, p. 16.

Article printed in TUT, 4$^{th}$Quarter 1995, No. 18, pp. 50–52 with English language abstract.

* cited by examiner

*Primary Examiner*—Mark Paschall
(74) *Attorney, Agent, or Firm*—Marshall, Gerstein & Borun

(57) ABSTRACT

In order to ensure that a vehicle seat, having a supporting face and incorporating microcapsules of phase-change material having a phase transition temperature between 15 and 37° C., is comfortable to use in terms of temperature, the support face is heated or cooled before the seat is used so that the phase-change material is at its transition temperature when a user subsequently sits on the seat.

15 Claims, 2 Drawing Sheets

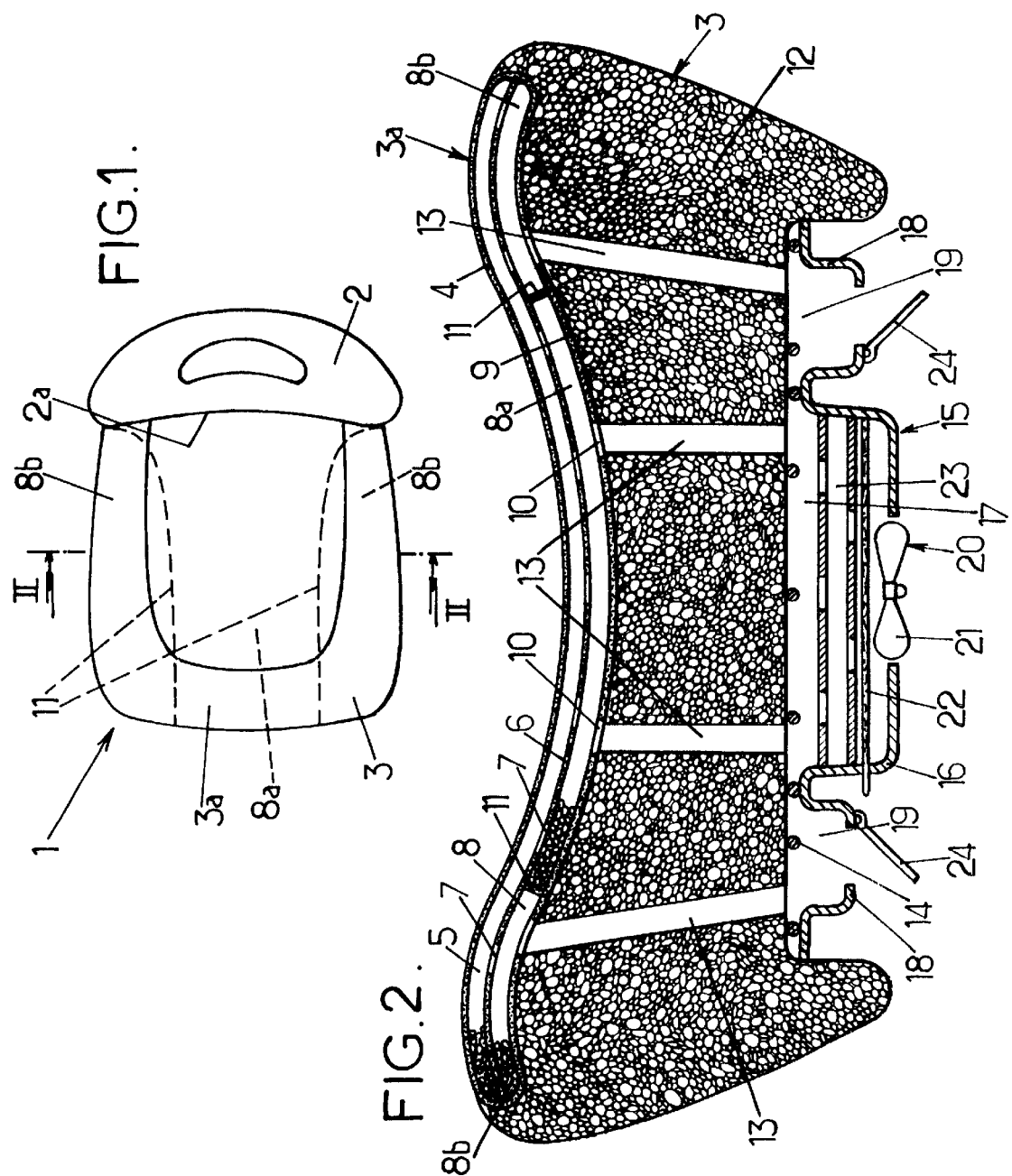

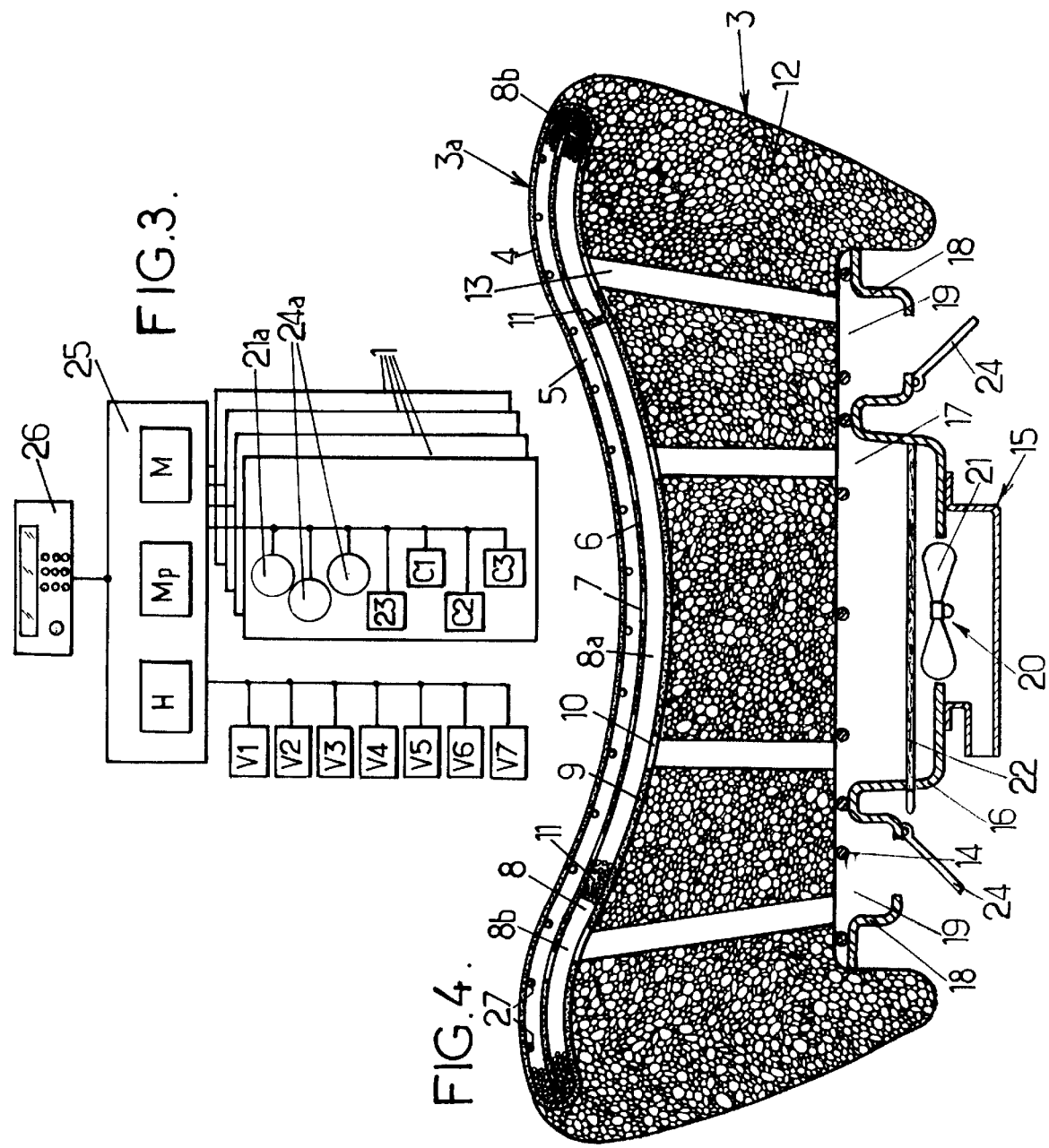

METHOD AND SYSTEM OF REGULATING HEAT IN A VEHICLE SEAT

FIELD OF THE INVENTION

The present invention relates to methods and systems of regulating heat in vehicle seats.

BACKGROUND OF THE INVENTION

As a means of regulating heat, vehicle seats have already been proposed, which have at least one supporting face designed to provide support for an occupant, this supporting face being made from a material susceptible to phase changes and exhibiting phase transition temperatures contained which a range between lower and upper limits of 15 and 37° C. (see, for example, the article entitled "thermal foam keeps seats and headliners warm in winter, cool in summer", Automotive & Transportation Interiors, October 1998, p. 16).

The known seats of this type therefore have a self-regulated surface temperature which, when the seat ceases to be occupied, is automatically maintained for a certain period of time within the range of phase transition temperatures of the phase-change material. As a result, if the user of the seat gets back into the seat within a relatively short time of having left it (1 hour, for example), his initial contact with the seat will be pleasant.

However, once the phase transition of the phase-change material is complete, the surface temperature of the seat follows the ambient temperature of the vehicle. Consequently, if the user of the seat gets back into the seat some time (2 hours, for example) after having left it, the climatic conditions in certain instances may cause the surface temperature of the seat to shift to values which make the initial contact of the user with the seat unpleasant or even painful.

As a matter of fact, the pleasant contact temperatures which can be supported for a long period of time are in the range of between 28 and 32° C., for example.

OBJECTS AND SUMMARY OF THE INVENTION

The specific purpose of the present invention is to overcome this drawback. To this end, the invention proposes a heat-regulating method for a vehicle seat, which has at least one supporting face designed to provide support for an occupant, this supporting face being made from a material susceptible to phase changes and exhibiting a range of phase transition temperatures having lower and upper limits comprised between 15 and 37° C. (this phase transition "range of temperatures" being, in certain instances, reduced to a single phase transition temperature, which will then constitute both the above-mentioned lower and upper limits), this method comprising steps which consist in:

measuring at least one reference temperature related to the temperature of the supporting face, monitoring the occurrence of at least a certain situation, which will be a situation requiring forced regulation, in which the seat is normally unoccupied, determining whether the reference temperature is within a certain predetermined temperature range, which will be the range at which forced regulation will be triggered, if the reference temperature falls within the range triggering forced regulation and if the situation of forced regulation is detected, activating a heat-regulating device set up to exchange thermal energy with the supporting face in an forced regulation mode configured so as to bring the temperature of the supporting face to the range of the phase transition temperatures of the phase-change material, and if at least one predetermined event occurs, terminating the forced regulation mode.

As a result of these features, when the forced regulation mode comes into operation, the supporting face of the seat is brought to a pleasant temperature before the seat is occupied, in cold weather and/or in warm weather.

This forced regulation mode may be activated:

immediately prior to use of the vehicle, and/or earlier in advance, for example when the vehicle is halted in readiness for the next occupancy of the vehicle, in which case calories or frigories will be accumulated in the phase-change material so that the seat will retain a pleasant surface temperature for as long as possible.

In preferred embodiments of the method proposed by the invention, one and/or the other of the following features may be incorporated:

the heat-regulating device consumes an electric power greater than its normal usage power when said heat-regulating device is operating in forced regulation mode;

it is detected whether a user really is occupying the seat and the forced regulation situation corresponds to at least one situation in which the seat is detected as having no occupant;

it is detected whether a user really is occupying the seat and the forced regulation situation corresponds to at least one situation in which the seat is detected as having no occupant and in which the corresponding door of the vehicle is locked after having been unlocked;

if the external atmosphere is at a temperature below a predetermined limit and the ambient air inside the vehicle is at a temperature higher than the lower limit of the range of phase transition temperatures of the phase-change material, the ambient air contained in the vehicle is circulated in contact with the phase-change material whilst the heat-regulating device is operating in forced regulation mode in order to raise the temperature of the supporting face of the seat to the range of phase transition temperatures;

if the external atmosphere is at a temperature higher than a predetermined limit or insolation is higher than a predetermined value and the ambient air inside the vehicle is at a temperature below the upper limit of the range of phase transition temperatures of the phase-change material, the ambient air contained in the vehicle is circulated in contact with the phase-change material whilst the heat-regulating device is operating in forced regulation mode in order to reduce the temperature of the supporting face of the seat to the range of phase transition temperatures;

it is detected whether a user really is occupying the seat and the forced regulation situation corresponds to at least one situation in which the seat is detected as having no occupant and in which the corresponding door of the vehicle is unlocked after having been locked;

the predetermined event which terminates the forced regulation mode is at least one of the following events:

a user gets into the seat,
the temperature of the supporting surface is within a certain predetermined range of values,
the heat-regulating device has been operating in forced regulation mode for a predetermined period of time,
the engine of the vehicle is started;
if the reference temperature is below a predetermined limit, heated air is circulated on the phase-change material at least for the period during which the heat-regulating device is operating in forced regulation mode;
the heat-regulating device has a heater mat arranged in the immediate vicinity of the phase-change material and, if the reference temperature is below a predetermined limit, the heater mat is heated at least for the period during which the heat-regulating device is operating in forced regulation mode;
the heat-regulating device has a Peltier effect thermoelectric module arranged inside the seat and, at least for the period during which said heat-regulating device is operating in forced regulation mode, air is circulated on the phase-change material following a heat exchange between this air and the thermoelectric module in order to:
either heat the phase-change material if the reference temperature is below a predetermined first limit,
or cool the phase-change material if the reference temperature is above a second predetermined limit (optionally the same as the above-mentioned first limit);
if the heat-regulating device is operating in forced regulation mode, a flow of pulsed air is fed across the support face of the seat in the direction of the occupant;
if the heat-regulating device is operating in a normal heat-regulation mode, air is sucked out from a permeable layer arranged immediately below the support surface of the seat, this suction being applied via suction passages arranged in a central part belonging to the seat, and the permeable layer is supplied with fresh air via air inlet passages arranged in lateral parts belonging to the seat and located on either side of said central part of the seat;
a humidity measurement is taken inside the seat in the vicinity of the support surface and, if this humidity measurement exceeds a predetermined threshold, air is sucked away from across the supporting face of the seat in a direction away from the occupant, through a permeable layer arranged immediately below said supporting face.

Another objective of the invention is to provide a heat-regulating system for a vehicle seat, which has at least one supporting face designed to provide support for an occupant, this heat-regulating device comprising:
a phase-change material exhibiting a range of phase transition temperatures varying between lower and upper limits of 15 and 37° C., this phase-change material being distributed across the supporting face of the seat,
a heat-regulating device designed to exchange thermal energy with said supporting face,
an electronic central unit programmed to control the heat-regulating device,
at least one temperature sensor set up to measure a reference temperature linked to the temperature of the supporting face of the seat, this temperature sensor being connected to the electronic central unit,
at least one status detector set up so as to detect at least one certain situation, which is a situation of forced regulation, in which the seat is normally unoccupied, the electronic central unit being programmed:
to determine whether the reference temperature is located within a certain temperature range, which is the range at which forced regulation is triggered,
if the reference temperature falls within the range at which forced regulation is triggered and if the status detector detects said forced regulation situation, to activate the heat-regulating device in accordance with an forced regulation mode programmed to bring the temperature of the supporting face to the range of phase transition temperatures of the phase-change material,
and if at least one predetermined event occurs, terminate the forced regulation mode.

BRIEF DESCRIPTION OF THE DRAWINGS

Other features and advantages of the invention will become clear from the following description of different embodiments, given by way of example and not restrictive in any respect, and with reference to the appended drawings.

Of the drawings:

FIG. 1 is a plan view of a seat fitted with one embodiment of a heat-regulating device proposed by the invention, FIG. 2 is a view in section along the line II—II of the seat-part of the seat illustrated in FIG. 1, FIG. 3 is a schematic view of the control system for the heat-regulating device used with the seat illustrated in FIGS. 1 and 2, and FIG. 4 is a view similar to that of FIG. 2, showing a second embodiment of the invention.

MORE DETAILED DESCRIPTION

The same references are used to denote the same or similar components in the different drawings.

FIG. 1 illustrates a vehicle seat 1 comprising:
on the one hand a backrest 2 having a front face or supporting face 2a designed to act as a support for the back of an occupant,
and on the other, a seat 3 having a top face or supporting face 3a, also designed to provide support for an occupant.

As illustrated in FIG. 2, the seat-part 3 of the seat has a surface covering 4, which covers at least the top face 3a of the seat and which is permeable to humidity and relatively permeable to air. This surface covering may be of a textile base (fabric which may or may not be coated, knitted fabric, plush, etc.) or a non-woven base ("alcantara" or other), micro-perforated leather, etc.. The covering 4 may be more permeable in the central part of the top face 3a of the seat-part, i.e. in the zone supporting the occupant.

Arranged underneath the covering 4 is a first layer 5 of a flexible and elastic material, several millimetres thick and very permeable to air, capable of retaining its permeability even when compressed under the weight of an occupant. This layer 5 may be made from a cross-linked polyurethane with open pores or alternatively from fabric.

In addition, a first flexible and impermeable film 6, made from a synthetic material, is arranged underneath the layer 5 and has vents 7 designed to provide a passage for air.

The microcapsules of phase-change material are also disposed in the vicinity of the top face 3a of the seat and preferably in one of the layers 4, 5, 6. The phase-change material has a temperature at which the transition between solid/liquid phase takes place, or more generally a range of phase transition temperatures (range of temperatures between lower and upper limits being constituted respectively by the crystallisation point and the melting point at atmospheric pressure), which is preferably within the range of between 15 and 35° C. and advantageously close to 30° C.

By way of example, the phase-change material used might be eicosane (crystallisation point: 30.6° C. and melting point: 36.1° C.), octadecane (crystallisation point: 25.4° C. and melting point: 28.2° C.), heptadecane (crystallisation point: 21.5° C. and melting point: 22.5° C.) or hexadecane (crystallisation point: 16.2° C. and melting point: 18.5° C.).

The microcapsules of phase-change material may be of the type sold under the "THERMASORB" brand by FRISBY TECHNOLOGIES Inc. (Bay Shore, New York State, USA) and incorporated in the polyurethane foams sold under the "COMFORTEMP" brand by LINWOOD (Pennsylvania, USA).

The microcapsules of phase-change material may optionally be combined with a humidity-regulating material such as duck down (which absorbs excess humidity from humid air and then restores this humidity in the presence of dry air).

Furthermore, a second permeable layer 8, made from a material identical or similar to that of the first permeable layer 5, is arranged underneath the first film 6, whilst a second flexible, impermeable film 9 identical or similar to the first film 6 is arranged underneath the second permeable layer 8.

The vents 10 in this second film are generally fewer in number than the vents 7 in the first film 6, these vents 10 preferably not being aligned with the vents 7.

In addition, two dividing walls 11 provide a join between the films 6 and 9 and seal off the second permeable layer 8, sub-dividing it into a central part 8a and two side parts 8b (see also 1a of FIG. 1), these dividing walls 11 possibly consisting of two weld seams between the films 6 and 9.

The film 9 is supported on a cushion 12 made from a flexible material, for example polyurethane foam, this cushioning being arranged underneath the second film 9 and having vertical channels 13 pierced through it to line up with the vents 10 of this film. The cushion 12 is in turn supported by a supporting layer 14, for example a layer of elastic metal wire, and under this supporting layer is a rigid or semi-rigid casing 15.

In the example illustrated, the casing 15 comprises:
  a central part 16 bounding an interior volume 17 which communicates with the channels 13 of the cushion 12 arranged respectively underneath the central part 8a of the second permeable layer 8,
  and two side parts 18, each of which bounds an interior volume 19 communicating with the channels 13 of the cushion 12 arranged respectively underneath the side parts 8b of the second permeable layer 8, neither of the interior volumes 19 having any communication with the interior volume 17.

The central part 16 of the casing has a heat-regulating device 20, which comprises:
  a fan 21 designed either to blow air into the interior volume 17 of the central part of the casing or suck air out from said interior volume in said central part and expel it to the exterior of the casing 15,
  preferably, a filter 22 designed to retain dust and/or neutralise odours, this filter being impregnated, as necessary, with diffuser elements such as cleansing solvents or perfumed substances,
  and a Peltier effect thermoelectric module 23 designed to heat the air flow pulsed towards the interior volume 17 of the central part of the casing or cool this flow of air.

In addition, each of the two side parts 18 of the casing has at least one electrically controlled flap 24, designed to be selectively opened or closed.

As illustrated in FIG. 3, the heat-regulating device of the seat is controlled by an electronic central unit 25 comprising in particular a microprocessor Mp, a memory M and a clock H (if necessary arranged in a group on a same electronic board), this central unit 25 being in turn controlled and programmed by a vehicle user from a control panel 26.

For each vehicle seat fitted with heat-regulating means, such as the seat described above, the central electronic unit 25 is connected to:
  an electric motor 21a, which controls the fan 21,
  stepper motors or other electromagnetic actuators 24a which control the flaps 24 of the side parts 18 of the casing respectively,
  the Peltier-effect thermoelectric module 23,
  at least one temperature sensor C1 arranged in the seat-part 3 of the seat close to the top face 3a,
  at least one humidity sensor C2 arranged in the seat 3, in the vicinity of the top face 3a,
  and at least one seat-occupancy sensor C3, such as a contact which closes under the weight of the occupant, for example.

In addition, the central unit 25 is connected to various sensors common to the vehicle as a whole, for example:
  at least a sensor V1 for the door locks,
  a sensor V2 for detecting operation of the engine,
  a sensor V3 for measuring the ambient temperature inside the vehicle,
  a sensor V4 for measuring the ambient temperature outside the vehicle,
  a sensor V5 for detecting operation of the air-conditioning and heating system of the vehicle or for measuring the temperature of this air/conditioning and/or heating system,
  a sensor V6 for measuring the battery charge of the vehicle,
  and an external insolation sensor V7.

The heat-regulating device described above operates in the following manner.

1) During cold weather:

Initially, if the sensor V1 detects that the doors have been unlocked following a state in which they were locked and the sensor C1 measures a temperature on the top face 3a of the seat which is below a predetermined limit, for example a temperature below the melting point of the phase-change material, the central unit 25:
  closes the flaps 24,
  and activates the heat-regulating device 20 at high power, in accordance with an forced regulation mode.

In this operating mode, the fan 21 operates in such a way that it creates a flow of air which is pulsed towards the interior of the seat whilst the Peltier-effect thermoelectric module 23 heats this flow of pulsed air to a temperature above 50° C. and preferably in the order of 60° C., for example.

Having been heated in this manner, the pulsed air flow crosses through the cushion 12 of the seat, passing through the channels 13 arranged under the central part 8 of the second permeable layer 8 after which the pulsed air flow penetrates the first permeable layer 5 and escapes from the seat via the covering 4 which covers the top face 3a of said seat.

The blowing of hot air in forced regulation mode is interrupted:

for each seat 1 fitted with heat-regulating means whenever the relevant sensor C3 detects that this seat is occupied, and/or for all the seats if the sensor V2 detects that the engine has been started, and/or for each seat if the relevant sensor C1 measures a temperature at the top face 3a of the seat which is at least equal to the melting point of the phase-change material.

However, hot air may be continue to be blown out in forced regulation mode and re-started periodically during operation of the vehicle on seats which are unoccupied.

Furthermore, hot air may also continue to be blown out in forced regulation mode throughout any period during which the vehicle is at a standstill and its seats are unoccupied if the vehicle has a sufficient power source, for example photoelectric cells capable of supplying the Peltier-effect thermoelectric module 23: accordingly, the vehicle seats will always be maintained at a pleasant temperature even before the doors are unlocked, except during the night when the photoelectric cells are not in operation.

If the heat-regulating device ceases operation in forced regulation mode and switches to a normal operating mode, the central unit 25 issues a command to open the flaps 24 of the side parts 18 of the casing and causes the heat-regulating device to operate at a lower power.

Generally speaking, the central unit 25 will cease operation of the thermoelectric module 23 and reverse the direction in which the fan 21 is operating so that the fan will suck air out from the interior volume 17 of the central part of the casing towards the exterior.

Consequently, the ambient air enters the interior volumes 19 of the side parts 18 of the casing via the flaps 24, penetrates the side parts 8b of the second permeable layer via the side channels 13 of the cushion, then passes into the first permeable layer 5 before returning to the central part 8a of the second permeable layer to be sucked in by the fan 21.

During this normal operating mode, the fan 21 may continue to operate, if necessary, to create a pulsed air flow towards the interior volume 17 of the central part of the casing if it is necessary to continue heating the top face 3a of the seat by means of the Peltier-effect thermoelectric module 23.

2) During warm weather:

If the sensor VI detects that the doors have been unlocked following a locked state and the sensor C1 measures a temperature at the top face 3a of the seat which is higher than a predetermined limit, for example a temperature higher than the crystallisation point of the phase-change material, the central unit 25 activates the heat-regulating device 20 at high power as above, in forced regulation mode, but causing the Peltier-effect thermoelectric module 23 to operate so that it cools the pulsed air flow to a temperature below 10° C., for example.

The blowing of cool air in forced regulation mode is interrupted:

for each seat 1 fitted with a heat-regulating device if the relevant sensor C3 detects that this seat is occupied, and/or for all the seats if the sensor V2 detects that the engine has been started, and/or for each seat 1 fitted with a heat-regulating device if the relevant sensor C1 measures a temperature at the top face 3a of the seat that is equal to the crystallisation point of the phase-change material.

As with the operating mode during cold weather:

the blowing of cold air in forced regulation mode may optionally be continued and periodically re-started during operation of the vehicle on seats which are unoccupied, the blowing of air in forced regulation mode may also be operated during the day for any period during which the vehicle is at a standstill and the seats are unoccupied, if the vehicle has photoelectric cells.

If the heat-regulating device 20 ceases operating in forced regulation mode and switches to normal operating mode, in the same way as operation during cold weather:

either operation of the thermoelectric module 23 is stopped by reversing the direction in which the fan 21 is operating, or a pulsed air flow continues to be generated towards the interior volume 17 of the central part of the casing if it is necessary to continue cooling the top face 3a of the seat by means of the Peltier-effect thermoelectric module 23.

In addition, outside of forced regulation mode, if the humidity sensor C2 detects a high level of perspiration from the occupant of the seat, the central unit 25 issues a command to close the flaps 24 and activate the fan 21 so as to suck air out from the interior volume 17 of the central part of the casing towards the exterior without operating the thermoelectric module 23.

In this case, the ambient air is sucked through the covering 4 of the seat, passing in succession into the first permeable layer 5, then into the central part 8a of the second permeable layer and then into the central channels 13 of the cushion 12 before being sucked in by the fan 21.

The second embodiment of the invention, which is illustrated in FIG. 4, is similar to the first embodiment described above and will therefore not be described again in detail.

This second embodiment differs from the first embodiment due to the fact that the heat-regulating device 20 does not have a Peltier-effect thermoelectric module 23 but only a fan 21 co-operating with its filter 22 and an electric heater mat 27 controlled by the central unit 25, this electric heater mat being arranged in the immediate vicinity of the top face 3a of the seat (a heater mat of this type may also be provided in the first embodiment of the invention as a complement to the thermoelectric module 23).

This second embodiment of the invention operates in a manner similar to that of the first embodiment described above, with the exception that:

in cold weather, the forced regulation mode will involve activating the heater mat, preferably to a temperature in excess of 50 or 60° C., and in warm weather, the heat-regulating device 20 will only be capable of blowing the ambient air of the vehicle into the interior of the seat 3.

Advantageously, in this case, if the vehicle has an air-conditioning system, it will be possible to make use of the presence of fresh air in the vehicle when it is at a standstill, in which case the heat-regulating device can be operated in forced regulation mode by closing the flaps 24 and creating a pulsed air flow to the interior of the seat 3 by means of the fan 21.

This particular mode of forced regulation is activated if:

the sensor V1 detects that the doors have been locked following a period in which the vehicle was operating and in a state in which said doors were unlocked, and the insolation sensor V7 detects a relatively high level of insolation and/or the external temperature sensor V4 detects an external temperature higher than a predetermined threshold, and the ambient temperature sensor V3 of the vehicle detects an internal ambient temperature below the melting point of the phase-change material and/or the sensor V5 has detected beforehand that the air-conditioning system is operating.

This being the case, the forced regulation mode can be interrupted in the situations described above in relation to the first embodiment of the invention or if the ambient temperature inside the vehicle becomes higher than or equal to the melting point of the of the phase-change material or if said internal ambient temperature becomes higher than or equal to the surface temperature of the seat or alternatively at the end of a predetermined time.

It should be pointed out that this specific forced regulation mode could, if necessary, be used for the first embodiment of the invention to complement the forced regulation mode already described above in relation to this first embodiment of the invention.

Similarly, in the case of both embodiments of the invention, if the vehicle has an air-conditioning or heating system, the presence of warm air in the vehicle can be used when the vehicle is at a standstill during cold weather, in which case the heat-regulating device will be operated in forced regulation mode by closing the flaps 24 and creating a pulsed flow of air to the interior of the seat 3 by means of the fan 21, without operating the thermoelectric module 23 or the heater mat 27.

This specific mode of forced regulation is activated if:

the sensor V1 detects that the doors have been locked following a period in which the vehicle was operating and a state in which said doors were unlocked, and the sensor V2 detects an external temperature below a given threshold, and the ambient temperature sensor V3 of the vehicle detects an internal ambient temperature higher than the crystallisation point of the phase-change substance and/or the sensor V5 has previously detected that the air-conditioning or heating system of the vehicle is operating.

This mode of forced regulation is then halted in accordance with criteria similar to those applicable to the specific mode of forced regulation described above.

With all embodiments, the heat-regulating device can be prevented from operating in forced regulation mode if the sensor V6 detects that the battery charges are too low.

Finally, it should be pointed out that with all the embodiments of the invention, a heat-regulating device similar to that described above could also or only be provided in the backrest, in which case the structure of the backrest will be similar to that described above in relation to the seat.

It should be pointed out that the device proposed by the invention may also be used, if necessary, to clean the seat, since the various layers of the covering may have a tendency to become soiled.

In this case, the cleaning process is operated as follows:

the filter 22 described above is replaced with a special filter charged with volatile cleansing substances, such as trichloroethylene, for example, or perfumed substances, the flaps 24 are closed, a check is made to ensure that the interior and the seats are unoccupied, for example by means of appropriate sensors such as the seat-occupancy sensors C3, and the fan 21 is operated, preferably sending the pulsed air into the interior of the seat whilst operating the thermoelectric module 23 and/or the heater mat 27 at the highest temperature possible so that the hot air charged with cleansing substances passes through the permeable lining of the seat covering, cleaning it as it does so, and, after the cleaning operation, the conventional filters 22 are replaced, as described above.

I claim:

1. A heat-regulating method for a vehicle seat, which has at least one supporting face designed to provide support for an occupant, this supporting face being made from a material susceptible to phase changes and exhibiting a range of phase transition temperatures having lower and upper limits comprised between 15 and 37° C., this method comprising steps which consist in:
measuring at least one reference temperature related to the temperature of the supporting face,
monitoring the occurrence of at least one certain situation, which will be a situation requiring forced regulation, in which the seat is normally unoccupied,
determining whether the reference temperature is within a certain predetermined temperature range, which will be the range at which forced regulation will be triggered,
if the reference temperature falls within the range triggering forced regulation and if the situation of forced regulation is detected, activating a heat-regulating device set up to exchange thermal energy with the supporting face in an forced regulation mode configured so as to bring the temperature of the supporting face to the range of phase transition temperatures of the phase-change material,
and if at least one predetermined event occurs, terminating the forced regulation mode.

2. A method as claimed in claim 1, in which the heat-regulating device consumes an electric power greater than its normal usage power when said heat-regulating device is operating in forced regulation mode.

3. A method as claimed in claim 1, in which it is detected whether a user really is occupying the seat and the forced regulation situation corresponds to at least one situation in which the seat is detected as having no occupant.

4. A method as claimed in claim 1, in which it is detected whether a user really is occupying the seat and the forced regulation situation corresponds to at least one situation in which the seat is detected as having no occupant and in which the corresponding door of the vehicle is locked after having been unlocked.

5. A method as claimed in claim 4, in which, if the external atmosphere is at a temperature below a predetermined limit and the ambient air inside the vehicle is at a temperature higher than the lower limit of the range of phase transition temperatures of the phase-change material, the ambient air contained in the vehicle is circulated in contact with the phase-change material whilst the heat-regulating device is operating in forced regulation mode in order to raise the temperature of the supporting face of the seat to the range of phase transition temperatures.

6. A method as claimed in claim 4, in which, if the external atmosphere is at a temperature higher than a predetermined limit or insolation is higher than a predetermined value and the ambient air inside the vehicle is at a temperature below the upper limit of the range of phase transition temperatures of the phase-change material, the ambient air contained in the vehicle is circulated in contact with the phase-change material whilst the heat-regulating device is operating in forced regulation mode in order to reduce the temperature of the supporting face of the seat to the range of phase transition temperatures.

7. A method as claimed in claim 1, in which it is detected whether a user really is occupying the seat and the forced regulation situation corresponds to at least one situation in which the seat is detected as having no occupant and in which the corresponding door of the vehicle is unlocked after having been locked.

8. A method as claimed in claim 1, in which the predetermined event which terminates the forced regulation mode is at least one of the following events:

a user gets into the seat, the temperature of the supporting surface is within a certain predetermined range of values, the heat-regulating device has been operating in forced regulation mode for a predetermined period of time, the engine of the vehicle is started.

9. A method as claimed in claim 1, in which if the reference temperature is below a predetermined limit, heated air is circulated on the phase-change material at least for the period during which the heat-regulating device is operating in forced regulation mode.

10. A method as claimed in claim 1, in which the heat-regulating device has a heater mat arranged in the immediate vicinity of the phase-change material and, if the reference temperature is below a predetermined limit, the heater mat is heated at least for the period during which the heat-regulating device is operating in forced regulation mode.

11. A method as claimed in claim 1, in which the heat-regulating device has a Peltier effect thermoelectric module arranged inside the seat and, at least for the period during which said heat-regulating device is operating in forced regulation mode, air is circulated on the phase-change material following a heat exchange between this air and the thermoelectric module in order to:

either heat the phase-change material if the reference temperature is below a predetermined first limit, or cool the phase-change material if the reference temperature is above a second predetermined limit.

12. A method as claimed in claim 1, in which if the heat-regulating device is operating in forced regulation mode, a flow of pulsed air is fed across the support face of the seat in the direction of the occupant.

13. A method as claimed in claim 1 in which, if the heat-regulating device is operating in a normal heat-regulation mode, air is sucked out from a permeable layer arranged immediately below the support surface of the seat, this suction being applied via suction passages arranged in a central part belonging to the seat, and the permeable layer is supplied with fresh air via air inlet passages arranged in lateral parts belonging to the seat and located on either side of said central part of the seat.

14. A method as claimed in claim 1 in which a humidity measurement is taken inside the seat in the vicinity of the support surface and, if this humidity measurement exceeds a predetermined threshold, air is sucked away from across the supporting face of the seat in a direction away from the occupant, through a permeable layer arranged immediately below said supporting face.

15. A heat-regulating system for a vehicle seat, which has at least one supporting face designed to provide support for an occupant, this heat-regulating device comprising:

a phase-change material exhibiting a range of phase transition temperatures varying between lower and upper limits of 15 and 37° C., this phase-change material being distributed across the supporting face of the seat, a heat-regulating device designed to exchange thermal energy with said supporting face, an electronic central unit programmed to control the heat-regulating device, at least one temperature sensor set up to measure a reference temperature linked to the temperature of the supporting face of the seat, this temperature sensor being connected to the electronic central unit, at least one status detector set up so as to detect at least one certain situation, which is a situation of forced regulation, in which the seat is normally unoccupied, the electronic central unit being programmed:

to determine whether the reference temperature is located within a certain predetermined temperature range, which is the range at which forced regulation is triggered, if the reference temperature falls within the range at which forced regulation is triggered and if the status detector detects said forced regulation situation, to activate the heat-regulating device in accordance with an forced regulation mode programmed to bring the temperature of the supporting face to the range of phase transition temperatures of the phase-change material, and if at least one predetermined event occurs, terminate the forced regulation mode.

\* \* \* \* \*